UNITED STATES PATENT OFFICE.

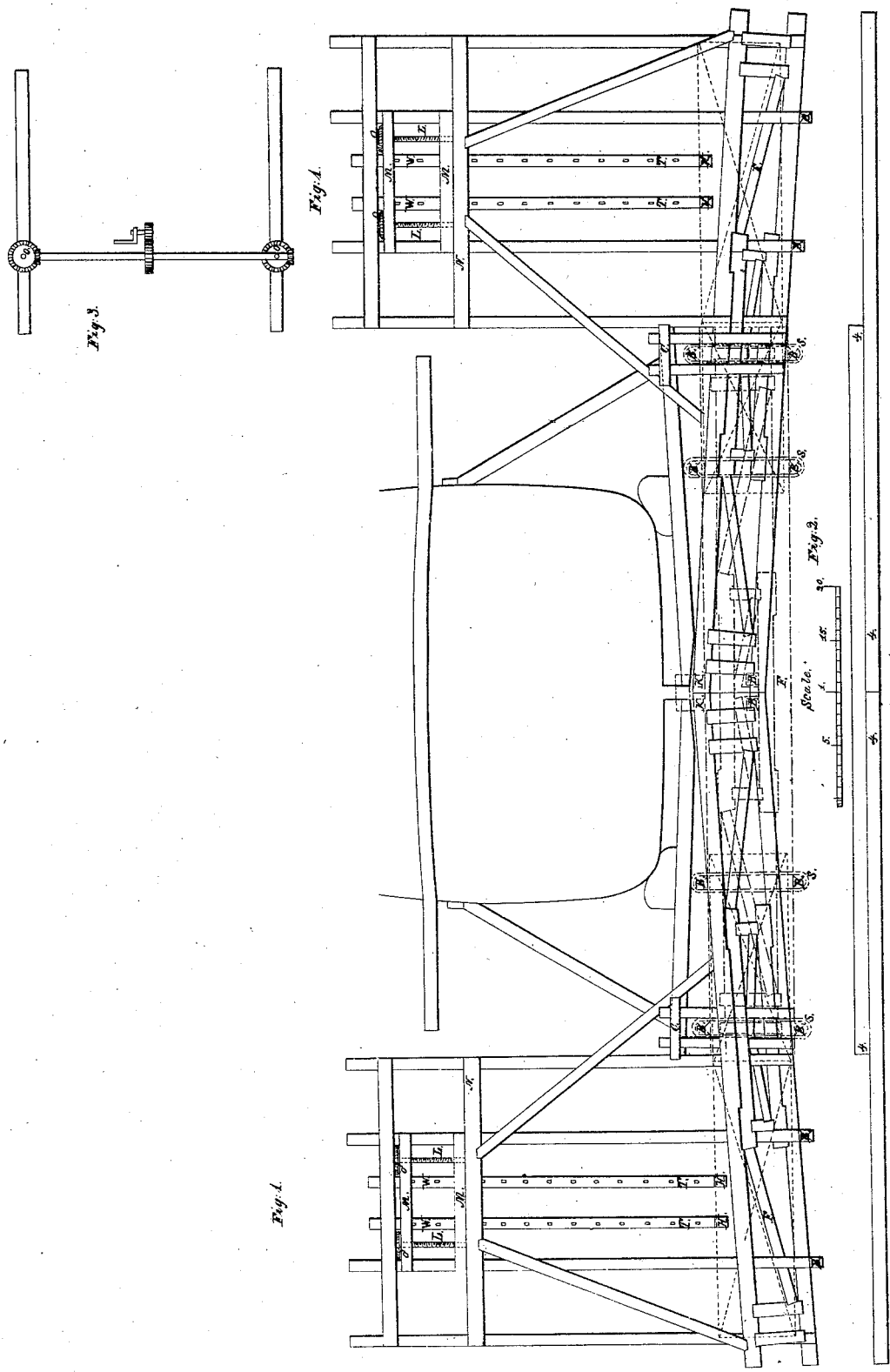

JOHN THOMAS, OF NEW YORK, N. Y.

FLOATING DRY-DOCK.

Specification of Letters Patent No. 2,149, dated June 26, 1841.

*To all whom it may concern:*

Be it known that I, JOHN THOMAS, of the city, county, and State of New York, have invented a new and useful Floating Dry-Dock for Repairing Ships and other Vessels; and I do hereby declare that the following is a full, clear, and exact description of the construction and operation of the same, reference being had to the annexed drawing, making part of this specification, in which—

Figure 1 is a transverse section, Fig. 2 is an edge view of three trap frames showing their connections and the manner in which they are bolted and doweled together.

The name or title of said dock is John Thomas' floating (?) dock.

The dock may consist of any number of sections over two and as all the sections are alike, a description of one will serve for the whole. The size will depend on size of the ships, or other vessels which are to be repaired.

The dock which is represented in the drawing is to consist of eight sections, and is to be 2,800 tons capacity, six trap frames, three on each side, as are shown in the drawing, Fig. 2,—4, 4, 4, and connected by the beams marked Fig. 1, B, B, B, B, B, B, B, B, B, B, B, B, B constitute one section. There are two other strong beams on which the keel blocks rest marked, Fig. 1, K, K. The trap frames may be made in various ways known to carpenters. The connection of the sections is by mains of strong pins passing through frames Fig. 1, c, c, as in the patent of 1837 of a floating dry dock. There are four strong iron straps 4 inches wide 1¼ inches thick to connect the upper and lower beams of each section Fig. 1, s, s, s, s. At the ends of the trap frames are other frames which stand vertical Fig. 1, N, N to which is attached the apparatus by means of which the floats are depressed and the dock raised with the ship or vessel a convenient height out of the water to perform the repairs on her bottom. The movable end floats have on each two strong beams, near the middle, Fig. 1, H, H, H, H, to each of which is attached two tongue pieces with key holes and plates, Fig. 1, T, T, T, T. The machinery for depressing said floats, consist of eight screws two on each section 3½ inches diameter four at each end, Fig. 1, L, L, L, L each screw is six feet long. The thread of the screw is cut one half from right to left. The other half from left to right. There are two followers to each pair of screws marked Fig. 1, M, M, M, M and two nuts or boxes in each. When the movable end floats are to be depressed, and the screws turned for that purpose from right to left, the keys are placed to the lower part of the upper follower Fig. 1, W, W. As the upper follower descends to the middle of the screw, the lower follower ascends to the same point, the keys are then placed under the lower follower, the screws then being turned from left to right, the float is depressed and the lower followers descend to the lower end of the screws, and the upper follower to the upper end of the screws, and thus alternately the followers descend and ascend and thereby depress the movable floats so as to displace a weight of water, equal to the weight of the vessel, and that part of the dock to be raised above the water. The bevel wheels are shown in Fig. 1ª and Fig. 3ª. The pinions and crank Fig. 3, 6, 6, 6.

I am aware that end floats have been used in floating dry docks for the double purpose for preserving the equilibrium of the dock and to assist the main floats in the body of the dock in raising the vessel and frame. The main floats being sunk by admitting water into them and then by pumping it out, and therefore I do not claim merely the use of end floats, or dispensing with the inner or main floats, as heretofore known, and used, but What I do claim as my invention and desire to secure by Letters Patent is 1. The employment of movable end floats of sufficient capacity to raise the vessel or vessels, and dock by forcing them down by mechanical force, when used without the inner or main floats employed heretofore for the purpose, and in the manner specified.

2. I also claim the combination of the right, and left handed screws, followers, tongue pieces, and movable floats, for the purpose, and in the manner described.

JNO. THOMAS.

Witnesses:
B. K. MORSELL,
W. REARDEN.